United States Patent [19]

Grupa

[11] Patent Number: 4,622,831
[45] Date of Patent: Nov. 18, 1986

[54] AIR-CONDITIONING PLANT FOR MOTOR VEHICLES, ESPECIALLY FOR BUSES

[75] Inventor: Johann Grupa, Stockdorf, Fed. Rep. of Germany

[73] Assignee: Webasto-Werk W. Baier GmbH & Co., Fed. Rep. of Germany

[21] Appl. No.: 703,991

[22] Filed: Feb. 21, 1985

[30] Foreign Application Priority Data

Feb. 21, 1984 [DE] Fed. Rep. of Germany ....... 3406249

[51] Int. Cl.$^4$ .............................................. B60H 1/32
[52] U.S. Cl. ...................................... 62/244; 62/427; 62/DIG. 16
[58] Field of Search ............... 62/239, 244, 427, 498, 62/DIG. 16; 165/42, 43

[56] References Cited

U.S. PATENT DOCUMENTS

| | | | |
|---|---|---|---|
| 2,032,572 | 3/1936 | Hammers et al. | 62/427 X |
| 2,258,565 | 10/1941 | Bergstrom | 62/427 X |
| 2,784,568 | 3/1957 | Schjolin | 62/239 X |
| 3,417,576 | 12/1968 | Stucky | 62/244 |
| 3,862,549 | 1/1975 | Fernandes | 165/42 X |
| 4,043,143 | 8/1977 | Fluder et al. | 62/244 X |
| 4,201,064 | 5/1980 | Krug et al. | 62/244 X |
| 4,217,764 | 8/1980 | Armbruster | 62/244 X |

*Primary Examiner*—William E. Tapolcai
*Attorney, Agent, or Firm*—Sixbey, Friedman & Leedom

[57] ABSTRACT

An air-conditioning plant for motor vehicles, which comprises a condenser and an evaporator, is developed and disposed in such a way that it may be integrated, as a pre-assembled construction unit, into the roof frame of a roof construction of a motor vehicle. The condenser contains a large surface condenser block disposed so as to be inclined downwardly toward the front end of the vehicle and lowered partly below the level of the roof. The condenser fans are disposed at the height of the tail end of the vehicle. Below the condenser, evaporator blocks of the evaporator are arranged standing edgewise such that, between the evaporator blocks, a channel-shaped space remains open but which is closed toward the side of the roof by the bottom of the condenser trough. This channel-shaped space runs continuously in the longitudinal direction of the vehicle. As a top roof part, a fresh air part is provided that contains fresh air channels which make possible a fresh air feed-in free of pressure head into the interior space of the vehicle by a connection with the fresh air intake areas of the evaporator. The conditioned air at the outside of the evaporator blocks is conveyed to air channels, with the help of evaporator fans, the channels running in the longitudinal direction of the vehicle. The flow emerging from the evaporator fans is directed in a horizontal direction and may be introduced without deflection into the air channels.

22 Claims, 12 Drawing Figures

AIR-CONDITIONING PLANT FOR MOTOR VEHICLES, ESPECIALLY FOR BUSES

BACKGROUND AND SUMMARY OF THE INVENTION

The invention deals generally with an air-conditioning plant for motor vehicles and especially with an air-conditioning plant which is intended for buses. A typical air-conditioning plant of this type has a condenser and an evaporator which are disposed partitioned, side by side, in trough-like housings. The condenser has a large-surface condenser block extending transversely to the direction of travel and inclined downwards in the direction of travel and contains condenser fans which carry off the condenser exhaust air to the outside. The evaporator contains evaporator blocks extending in the direction of travel and disposed at a distance transversely to the direction of travel. Furthermore, a fresh air intake space is associated with the evaporator part by way of which fresh air is drawn in by means of evaporator fans which also convey the air, after it has passed through the evaporator, as conditioned air into an air channel of the vehicle which extends in the longitudinal direction of the vehicle at the transition area between the roof and lateral surfaces of the motor vehicle.

From the German Offenlegungsschrift 32 24 895, an air-conditioning plant for motor vehicles of the previously mentioned type has been known which is intended especially for buses. This air-conditioning plant is intended for on-roof mounting and is designed to have a flat configuration. Despite the provision of a flat configuration, it has turned out, however, that there are applications when the height above the roof, especially in the case of buses, will be limited by regulations in such a way that the known air-conditioning plant cannot be used for on-roof mounting, since it leads to a superstructure height above the roof that is too great. Furthermore, in the case of the known air-conditioning plant, the condenser and the evaporator are mounted lying one behind the other on the roof in the direction of travel, and trough-shaped housing parts of the condenser part and the evaporator part are attached to the contour of the roof. Since the plant, as a whole, is mounted on the roof of the vehicle, arrangements must be provided for carrying off rainwater as well as arrangements for carrying off condensation water which occur in the air-conditioning plant.

From the German Offenlegungsschrift 27 57 415, another air-conditioning plant has been known for mounting on the roof wherein the condenser block is aligned approximately edgewise and is inclined upwards at a steep angle in the direction of travel. However, difficulties result in the situation where large heat condenser exchange surfaces must be accommodated to achieve a relatively high cooling capacity. The length of the condenser block is predetermined by the maximum width of the vehicle, and the height should be as small as possible, not only for esthetic reasons but also with a view to a favorable air resistance number ($C_w$), so that the total weight of the air-conditioning plant in excess of the standard measure of height of the vehicle should not be considerably greater. However, if the condenser block is enlarged in the direction of depth, since the hind rows of pipe contribute a comparatively small amount to the total performance, an unfavorable ratio of weight, price and performance of the condenser will result. Additionally with a depthwise enlargement, the air flow resistance of the condenser will also become greater so that fans with a higher performance will be required as a countermeasure, as a result of which the weight and the costs of the installation will increase.

From the German utility Pat. No. 77 14 617, an air-conditioning plant has been known for mounting on the roof which has two parallel condenser blocks extending in the direction of travel. Since the height is limited, the heat exchanger surfaces can be enlarged only by extending either the length or the depth. This, in turn, leads to relatively deep condenser blocks. Additionally, an increased air resistance has to be overcome in the condenser, since deflections of air are needed.

In view of the foregoing, the invention has a primary object of developing an air-conditioning plant for motor vehicles of the initially mentioned type which will have a favorable ratio of cooling efficiency, weight and price, a height that is as small as possible especially a decreased height above the vehicle roof as compared to the air-conditioning plant according to the German Offenlegungsschrift 32 24 895, and will be integratable into the skeleton of the roof construction without any significant changes.

It is a further object to provide an air-conditioning plant which can be built-in, especially in the tail area of a vehicle, with only slight height of construction above the roof while also taking into consideration the fact that a sufficient height for standing up is ensured, especially in the aisle of the passenger compartment of the vehicle.

Additionally, it is preferable to enable an admixing of fresh air via the air-conditioning plant. Moreover, not only should the plant be designed flat, but also compact in its total dimensions in order to take into account the available limited conditions of space. For example, according to special regulations, it is required that the height of construction above the roof of the vehicle may run maximally to 127 mm.

In this respect, applicant's motor vehicle air-conditioning plant is distinguished by the characteristics that the condenser is inclined downwardly in the direction of travel and is partially under the level of the roof construction of the vehicle in the rear area of the vehicle; that the evaporator part is disposed, in a direction toward the vehicle interior, below the condenser; that the evaporator blocks of the evaporator are disposed at such a distance from one another that a channel-shaped interval remains free between them; and that the condenser fans are disposed behind the condenser in the rear area.

In the case of the air-conditioning plant of the invention, an efficient large-surface condenser block of flat construction has been provided for the condenser part, whereby the condenser part with the condenser trough is partially lowered below the roof level, in order to achieve the desired construction height above the roof without any loss in cooling performance and without reduction of the effective heat exchange surfaces. The large-surface condenser block, in this case and viewed in the direction of forward travel, is disposed inclined downwards in order to enable the entire heat exchange surface to be acted upon relatively evenly by air in order to ensure a complete utilization of the available heat exchange surface. In case of the arrangement according to the invention, a part of the slantingly disposed condenser block is also below the level of the roof, particularly the part lying forward in the direction of travel, yet the height available for passengers to stand up in the inside space of the vehicle is, however, only slightly decreased and only in the tail area of the vehicle.

In order to keep the longitudinal dimensions of the air-conditioning plant as small as possible, the evaporator part is provided below the condenser part in the direction toward the interior space of the vehicle. In this case, the evaporator blocks are disposed edgewise parallel to one another, in the tail area above the seats, at such a distance in relation to one another that a channel-shaped space is provided between them, which makes it possible that, especially, the height for passengers to stand up in the central aisle area may still be of sufficient dimensions. As a result, an air-conditioning plant that is very compact in its longitudinal dimensions is obtained and a part of it lies below the level of height of the roof, reducing its overall height on the vehicle.

In order to increase the efficiency of the condenser, the condenser fans are disposed in the tail area of the vehicle behind the large-surface condenser block so that an exceedingly favorable flow with little resistance through the condenser part, from its inlet to its outlet, is obtained. Since the air-conditioning plant extends, altogether, to the tail part of the motor vehicle, the carrying off of rainwater from the part of the condenser projecting beyond the level of the roof will cause no problems, since the rainwater can be carried off over the back pane without the use of drain hoses in the body of the vehicle. The extremely favorable flow through the condenser with little resistance may also be accompanied by advantages so that, dependent on the outside temperature and possibly on the speed of travel, sufficient condenser cooling will be ensured even when the condenser fan is turned off.

Whenever, then the air-conditioning plant is capable of operating with a turned off condenser fan, the useful life of the driving motors of the condenser fan will be improved, the need for current taken from the power supply of the vehicle will be reduced and the air-conditioning plant may be operated in an energy efficient manner. Furthermore, the air-conditioning plant, especially the condenser part and the evaporator part of it, has such dimensions that it may be integrated into the structure of the roof in the tail area of the vehicle in a manner that the longitudinal spars of the roof skeleton remain unchanged and only individual spars will possibly have to be changed but then, however, such spars may be made a component of the housing or may constitute the structure for accommodation of the air-conditioning plant. Despite the relatively slight constitutional length and width of the air-conditioning plant, one will obtain a high cooling performance which may be 23 Kw and greater.

Additional advantageous aspects of the invention include the fact that suction spaces of the evaporator part are developed running continuously in a longitudinal direction in parallel to the evaporator part are developed running continuously in a longitudinal direction in parallel to the evaporator blocks, so that suction spaces that are as large as possible with lowered resistance will be available. At the same time, the lateral surface limiting the channel-shaped interval between evaporator blocks may be used, also, in this case in an advantageous manner, which may be covered with a grid, for example, as a closure screen.

In accordance with embodiments of the invention, the condenser fans are disposed side-by-side transversely to the direction vehicle travel with the fan axles disposed horizontally in parallel to the vehicular travel direction. The air flow resistance from the inlet to the outlet of the condenser will be decreased further by such an arrangement since no deflection of exhaust air is provided, the condenser fans conducting the exhaust air of the condenser horizontally to the outside.

The front side of the housing surrounding the condenser fans may terminate approximately in an extension of the tail surface of the vehicle, in which case the rainwater may be conducted away from the condenser over the rear window of the vehicle in such a way that no rainwater can reach the condenser part of the air-conditioning plant.

With an embodiment of the air-conditioning plant according to the invention, wherein the housing surrounding the condenser fans is enlarged transversely to the vehicular travel direction relative to the condenser block, and the condenser fan axles are disposed approximately in the middle of the total height of the condenser and evaporator parts. In this respect, six condenser fans may be disposed so as to achieve an efficient air-conditioning plant without difficulties, the fans being distributed over the width of the tail of the vehicle without the height of the super structure being greater than that of the remaining part of the air-conditioning plant, especially of the condenser.

In accordance with further developments of the invention, the evaporator fans, which are formed preferably by double radial fans, are arranged such that the conditioned air, after passage through the evaporator blocks, may be introduced approximately in a horizontal flow into the air channels of the vehicle, likewise without any noteworthy deflection. In the case of the air-conditioning plant of the invention, the evaporator is arranged approximately in a horizontal plane starting out from the intake area up to the air channels. As a result of that, an even through-flow of the evaporator part with little resistance will be ensured.

Still further, heating batteries may be provided in the evaporator part which have the task of heating up the conditioned air, prior to its introduction into the air channels, whenever said air has been cooled too much during the through the evaporator blocks.

In an alternative embodiment for the reheating of conditioned air, the condenser exhaust air, which is warm, is used. Since, in the case of the air-conditioning plant designed according to the invention, the condenser and the evaporator are disposed directly adjacent to one another, but are largely partitioned relative to each other, one may achieve such a reheating simply by the fact that by means of regulating arrangements, the condenser exhaust air is mixed with the conditioned air prior to entry into the evaporator fan.

In accordance with another feature of the invention, a fresh air part is integrated into the total installation that extends, as a roof-top part, parallel to the condenser block up to the housing part that accommodates the condenser fan. This fresh air part makes it possible to feed in fresh air in a manner that is protected against rainwater and, especially, is free to pressure head across the fresh air channels which extend on both sides of the condenser trough of the condenser. The air channels are open in the front and the rear so that, in the area of the fresh air feed-in, no pressure head occurs. Furthermore, a connection with the intake area exists in front of the evaporator blocks by way of a spacing between the bottom of the condenser trough of the condenser part and the upper part of the condenser blocks. The portion of fresh air in this case is regulatable by means of a system of flaps.

As previously indicated, it is advantageous for the condenser block to be angled. For the angle of inclination of the condenser block with which one may ensure good cooling performances without increasing excessively the air resistance coefficient value $C_w$ for the motor vehicle, an angle of up to 20 degrees from horizontal, preferably 5 to 12 degrees and, especially 3 degrees is used.

In accordance with yet another aspect of the invention, the parts of the air-conditioning plant, condenser, evaporator, and fresh air part are disposed symmetrically to the central longitudinal axis of the roof of the vehicle, so that a pre-assembled construction unit, ready for mounting, may be installed with the use of longitudinal spars of the roof frame, which spars possibly may be integrated without difficulty into the housing construction of the air-conditioning plant as a carrier. The parts of the air-conditioning plant projecting into the interior passenger space are dimensioned such that they fit into the space existing between the longitudinal spars of the frame of the roof and pass through said space.

In the case of a specific embodiment of the air-conditioning plant of the invention, a cooling performance of 23 Kw and greater will be achieved with a short constructional length and a short width through the use of 3 double radial evaporator fans and six condenser fans. The elevation of the construction, altogether, above the contour of the roof, in this case, is approximately 127 mm. the length of the air-conditioning plant may be changed at any time corresponding to the required performances without the height and the width of the installation having to be changed.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

The embodiment, by way of example, of the air-conditioning plant for motor vehicles, according to the invention, shown in the drawings is intended for insertion in the form of a pre-assembled construction unit that is ready for mounting in the tail area of a bus.

Figure 1:
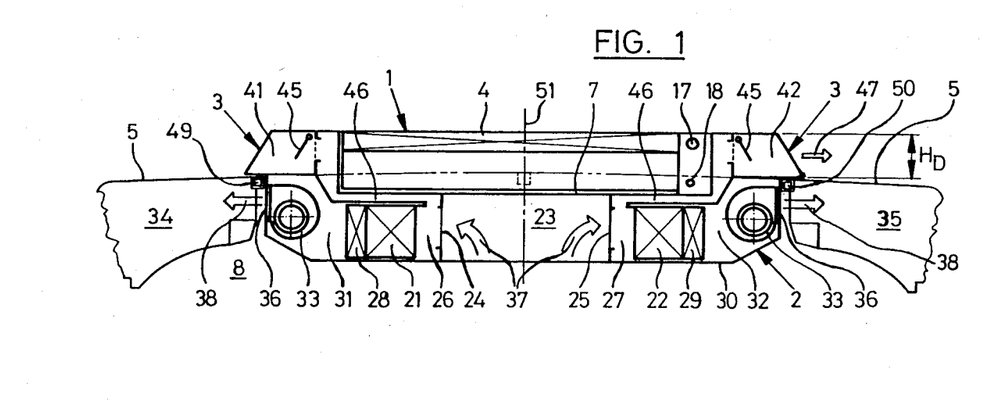
FIG. 1 shows a cross sectional view of an air-conditioning plant installed in the roof construction of a motor vehicle, such as a bus, viewed transversely to the vehicle longitudinal direction.

As can be seen particularly from FIG. 1, the air-conditioning plant shown has a condenser 1, an evaporator 2 and a fresh air part 3. The condenser 1 and the evaporator 2 are partitioned off relative to each other with the help of a trough-shaped construction. The fresh air part 3 is likewise partitioned off relative to the condenser 1. The fresh air part 3, however, may, likewise, be brought into connection with the evaporator.

Figure 2:
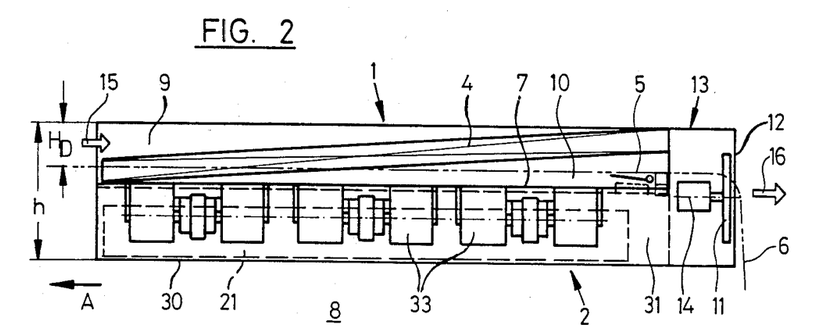
FIG. 2 shows a side view in partial section of the air-conditioning plant according to FIG. 1.
Figure 3:
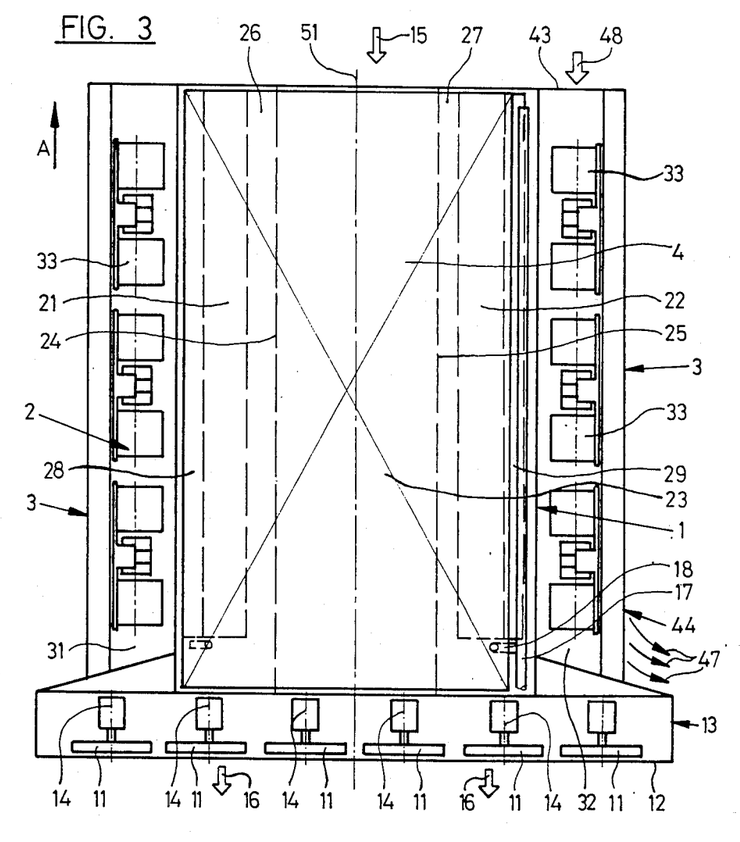
FIG. 3 is a top view of the air-conditioning plant according to FIG. 1 in partial section.
Figure 4:
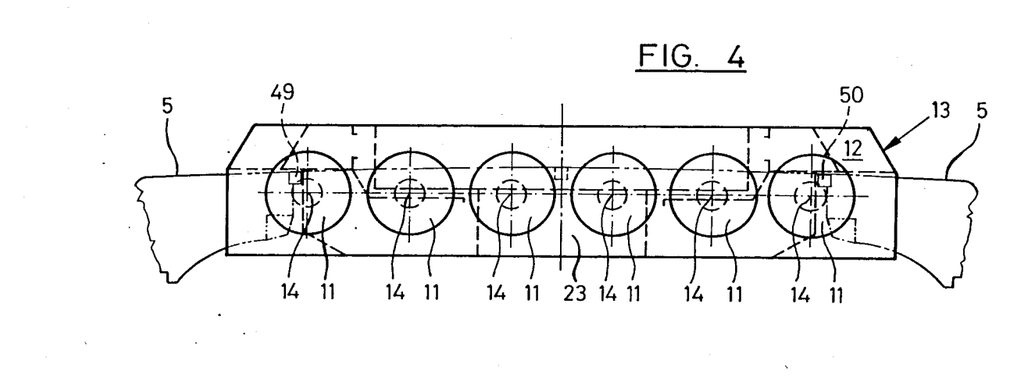
FIG. 4 is a rear view of the air-conditioning plant of FIG. 1 as seen from the direction of the tail end part of the vehicle.
Figure 5:
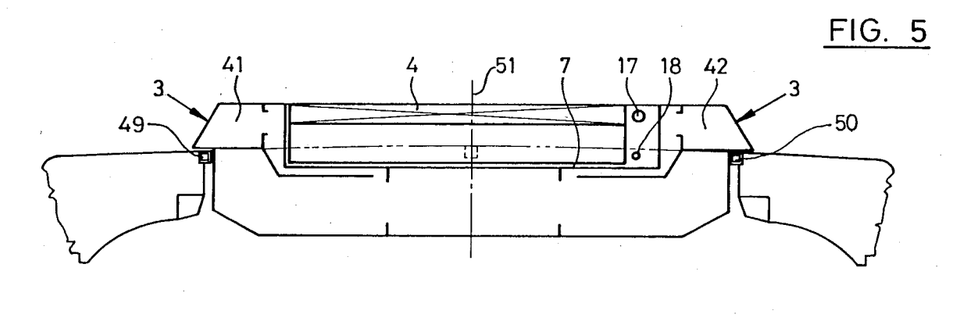
FIG. 5 shows a cross sectional view of the condenser part of the fresh air part of the air-conditioning plant according to FIG. 1.
Figure 6:
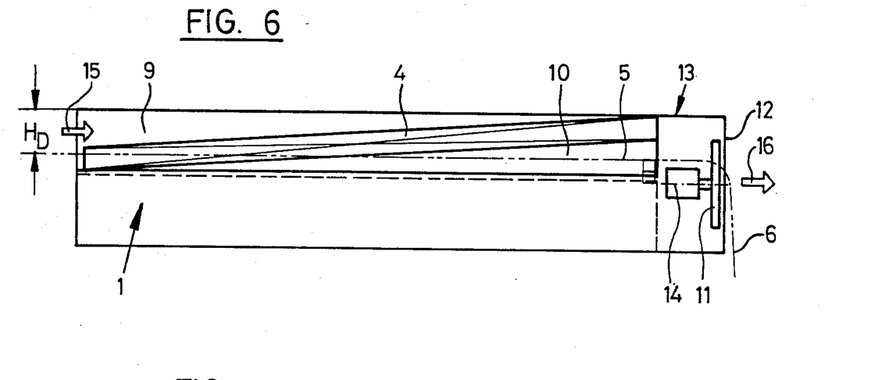
FIG. 6 is a side view of the condenser part.
Figure 7:
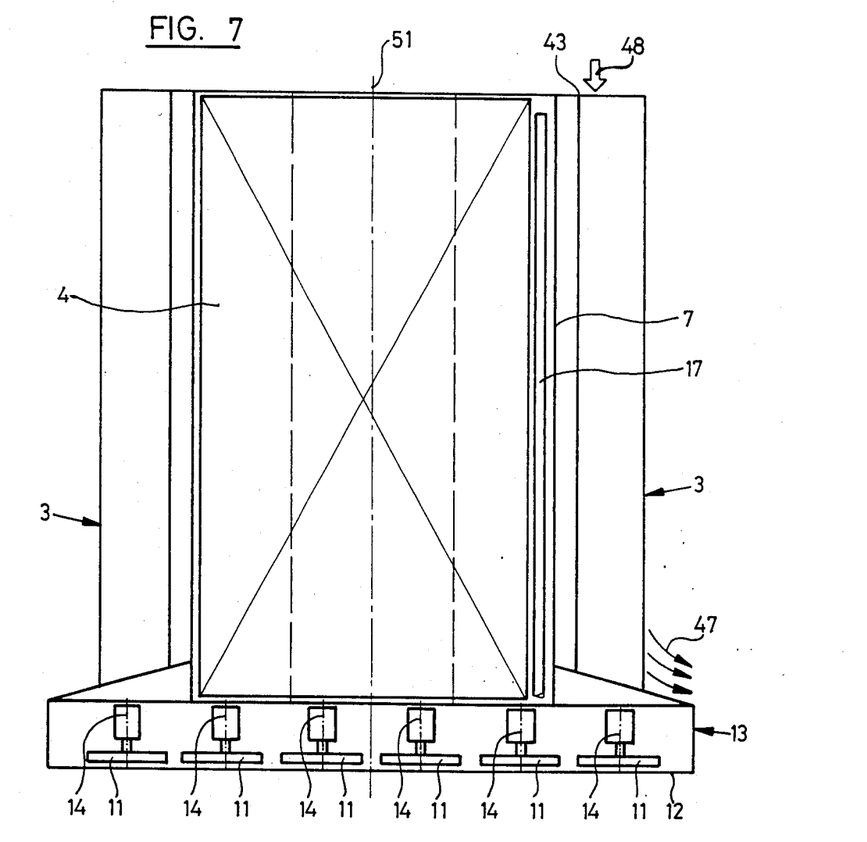
FIG. 7 is a top view of the condenser part.
Figure 8:
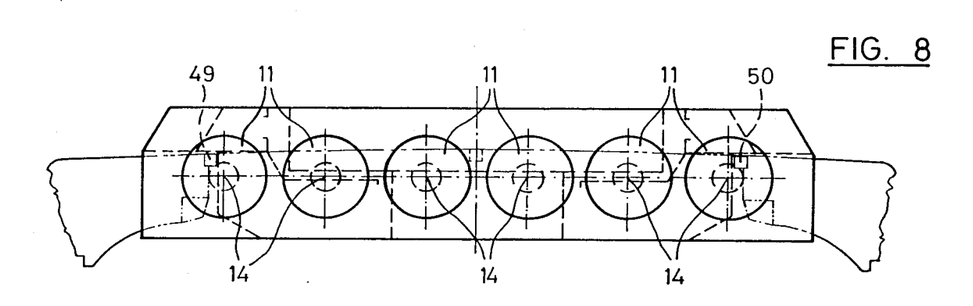
FIG. 8 is a rear view of the condenser part as seen in a direction toward the tail part of the vehicle.
Figure 10:
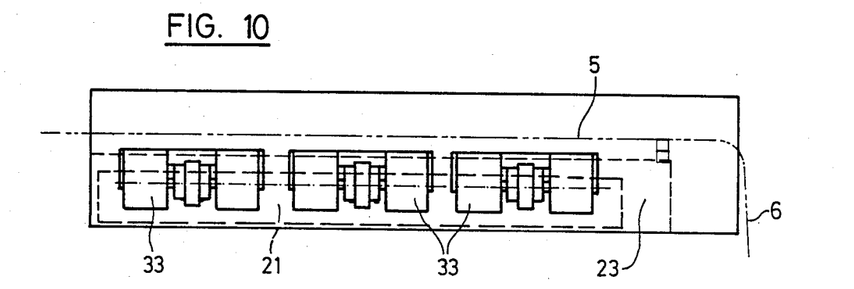
FIG. 10 is a side view of the evaporator part in partial section.

As can be seen from the FIGS. 1 and 2, the condenser 1 contains a large-surface condenser block 4 which, viewed in the direction of forward travel of the motor vehicle (only a portion of the roof of which is shown) designated with the arrow A in FIGS. 2 and 3 of the drawings, is disposed so as to be inclined downwards. As preferred angles of inclination, relative to horizontal, angles of up to 20 degrees, effectively from 5 to 12 degrees and in the case of the illustrated embodiment specifically about 3 degrees, are used. The large-surface condenser block 4 extends transversely to the longitudinal extent of the vehicle (i.e. travel direction arrow A). In the figures of the drawings the contour line of the top of the roof of the bus is designated by 5. The numeral 6 (FIGS. 2, 6 and 10) designates the tail line of the tail part of the bus.

As can be seen from the FIGS. 1 and 2, the large surface condenser block 4 of the condenser 1 is disposed inclined in such a way that it is lowered, at least partly, below the roof plane formed by the contour line 5 of the roof. The condenser trough 7, forming the receiving housing of the large surface condenser block 4, extends, therefore, likewise and also partially below the contour line 5 of the roof, and thus, projects partially into the interior passenger space of the bus. The interior space for the passengers is indicated schematically by the numeral 8.

The large-surface condenser block subdivides the space delimited by the condenser trough 7, as can be seen especially from FIG. 2, into two partial spaces 9 and 10 running in a longitudinally wedged-shaped manner. The partial space 9 is on the inflow side and the partial space 10 is on the outflow side of the condenser block 4. Furthermore, the condenser 1 also contains condenser fans 11, which are disposed on the outflow side of the condenser block 4, behind it in the tail area of the vehicle.

As can be seen, especially from FIG. 3, the housing part of the condenser 1 is enlarged transversely to the direction of travel (arrow A) at the rear of the condenser block 4 in order to be able, in the case of the embodiment shown by way of example, to accommodate six condenser fans 11, since the air-conditioning plant is intended for a high cooling performance. As can be seen from FIG. 2, the rear end 2 of the housing 13 surrounding the condenser fans 11 lies approximately in a vertical extension of the tail plane of the vehicle indicated schematically by the tail line 6. The axes 14 of the condenser fans 11 are disposed transversely side-by-side at a distance from one another and are aligned horizontally to the direction of travel (arrow A). As shown, the axes 14 of the condenser fans 11 are disposed approximately in the middle of the overall height, designated by h, of the condenser 1 and the evaporator 2. As is apparent, especially from the FIGS. 2 and 6, a particularly favorable through-flow, with little resistance from large surface condenser block 4, from the inlet side to the outlet side is obtained due to the development of these parts of the condenser 1; see in this respect inflow arrow 15 and outflow arrows 16 in FIG. 2.

Since the end 12 of the condenser housing 3 is located near the tail line 6, rainwater may be conducted off by way of the tail part of the vehicle, even without use of additional runoff arrangements, such as runoff hoses in the vehicle frame from the condenser part 1. Since, as can be seen from FIG. 2, the condenser housing space runs deeper in the area of the condenser fans 1 than in the area of the condenser block 4, one may also carry off any possibly occurring condensed water to this deeper part 1 and then to the tail area of the vehicle.

Although this is not shown, on the intake-air side of the condenser 1 (see arrow 15) and/or on the exhaust-air side of the condenser 1 (see arrows 16) grids are provided as closure screens.

From FIG. 3, the course of schematically indicated cooling agent lines 17, 18 is indicated, which lines are intended for the condenser 11 and the evaporator 2.

Of course, still other customary components that are not shown in detail in the drawings, are present in the air-conditioning plant, such as, especially, one or more cooling agent condensers, which may be accommodated at any practical place of the motor vehicle, for example, in the engine space and which are connected by way of additional cooling agent lines, not shown, with the condenser 1 and the evaporator 2. Also, at a suitable place, a cooling agent collector is accommodated which, likewise, has not been shown in particular.

Figure 11:
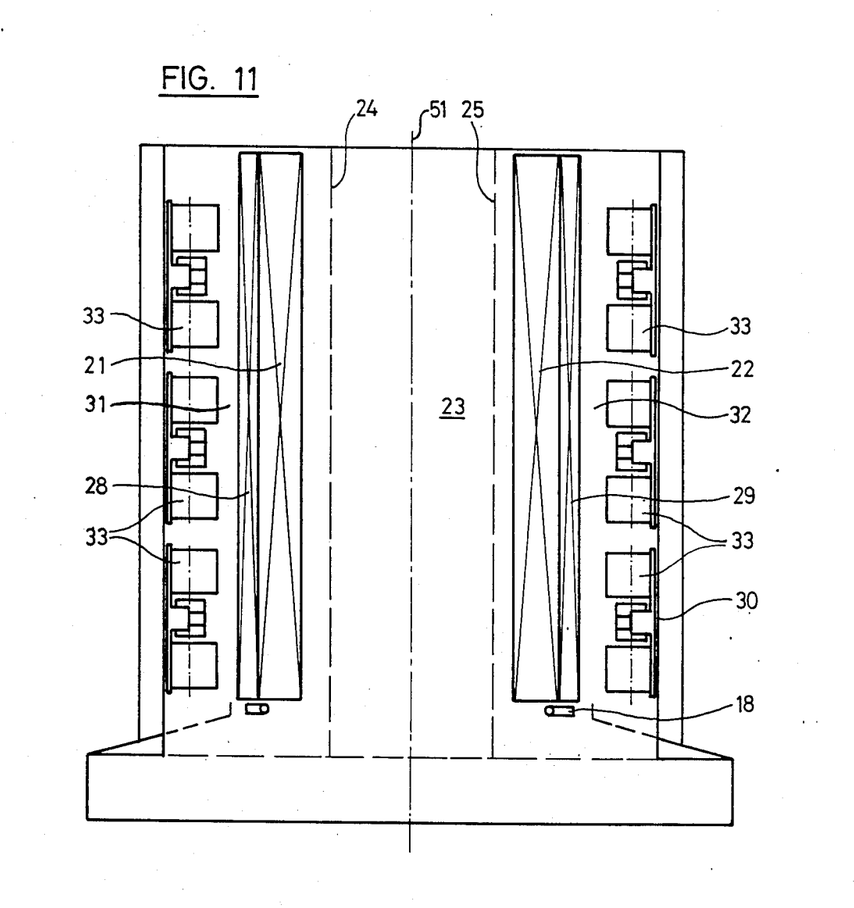
FIG. 11 is a top view of the evaporator part of the air-conditioning plant of FIG. 1.
Figure 12:
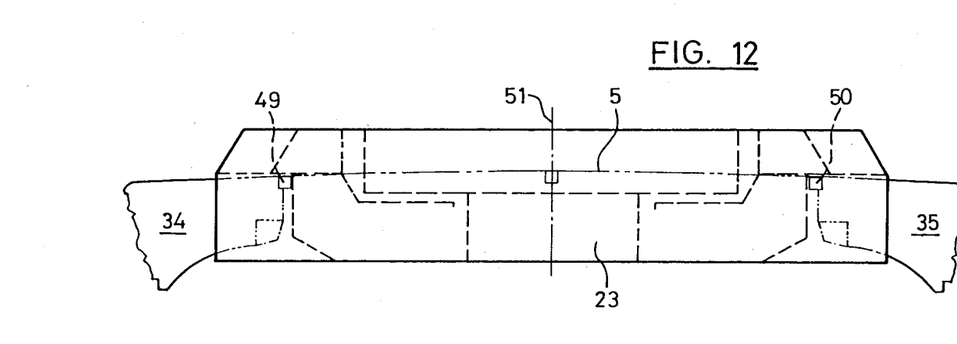
FIG. 12 is a rear view of the evaporator part of the air-conditioning plant of FIG. 1.

The evaporator designated generally by numeral 2, in the case of the illustrated embodiment, contains two evaporator blocks 21, 22 which are disposed standing edgewise. The evaporator 2 is completely partitioned off relative to the condenser 1 by means of the condenser trough 7. Furthermore, the evaporator 2 is disposed, in a direction toward the interior of the vehicle, below the condenser 1 and its condenser block 4. The evaporator blocks 21, 22 of the evaporator 2, in this case, are disposed at such a distance from one another, in a transverse direction, that a channel-shaped space 23 remains free between the evaporator blocks 21, 22. This channel-shaped space 23, as can be seen best from FIG. 11, runs in the longitudinal direction, i.e., in parallel to the longer sides of the evaporator blocks 21, 22, and extends continuously in the vehicle longitudinal direction. Viewed heightwise, this channel-shaped space 23 extends to the bottom of the condenser trough 7, and the bottom of the condenser trough 7 forms a closed top surface of the channel-shaped space 23.

The lateral surfaces 24, 25 of the channel-shaped space 23, running in parallel to the larger sides of the evaporator blocks 21, 22, constitute the intake areas 26, 27 for entry of outside air into the evaporator 2. As can be seen schematically, especially from FIG. 9, the lateral surfaces 24, 25 of the air intake areas 26, 27 are provided with a grid or some other type of air inlet closure screen arrangement. The channel-shaped space 23 makes possible that, in the center aisle between the rows of seats of the bus, there is a sufficient height for a person to stand despite the fact that the condenser and the evaporator 2 of the air-conditioning plant partially project into the interior space as a result of their recessed arrangement in the roof area near the tail part of the bus, i.e., space 23 approximately spans the aisle area of the bus interior.

As shown, a heating battery 28, 29 is assigned to each evaporator block 21, 22. The heating batteries 28, 29 are formed by hot water heat exchangers which are in connection with the motor coolant flow circuit, which may or may not be connected with additional heating means. These heating batteries 28, 29 are disposed at the sides of the evaporator blocks 21, 22 lying opposite the outside air intake areas 26, 27, and are intended for reheating of the cooled outside air during passage through the evaporator blocks 21, 22 or for the full heating operation of the air-conditioning plant.

Viewed in a transverse direction, evaporator fans 33 are provided in the conditioned air spaces 31, 32 formed by an evaporator housing 30 of the evaporator 2. These conditioned air spaces 31, 32 lie at about the level of the air channels 34, 35, which channels always run in the longitudinal direction of the bus in the transitional area from the roof contour line 5 and the longitudinal side surface of the bus. Such air channels 34, 35 are customarily provided, in the case of buses, even if there is no air-conditioning plant. As can be seen from the FIGS. 2 and 3, several evaporator fans 33 are disposed, in the cases of the illustrated embodiment with three evaporator fans 33, in parallel along the longitudinal extent of the evaporator blocks 21,22. Effectively, the evaporator fans 33 are formed by double radial fans.

Figure 9:
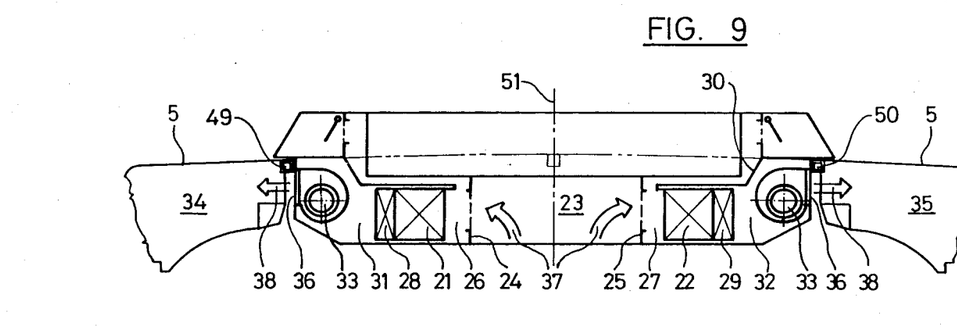
FIG. 9 is a cross sectional view of the evaporator part of the air-conditioning plant of FIG. 1.

According to FIGS. 1 and 9, the air exit openings 36 of the evaporator fans 33 point in a horizontal direction and are laterally aligned with the air channels 34, 35. As a result of this arrangement of the evaporator fans 33 at the level of the air channels 34, 35 and as a result of their horizontal outflow, it is possible to accommodate the evaporator fans in a space-saving manner. Especially, this arrangement produces minimal deflections of the conditioned air, from the exit side of the evaporator blocks 21, 22 to the entry into the air channels 34,35, so that extremely favorable through-flow characteristics are ensured, with little resistance, from the inlet side to the outlet side of the evaporator 2 up to the feeding-in of the air into channels 34, 35.

As indicated by arrow 37 in FIG. 1, the outside air is drawn in, in the area of the channel-shaped space 23, with the aid of evaporator fans 33 so that it passes through the evaporator blocks 21, 22 of the evaporator 2, optionally through the heating batteries 28, 29, and then reaches the conditioned air spaces 31, 32 of the evaporator 2. With the help of the evaporator fans 33 provided in the spaces 31, 32, the conditioned air in the spaces 31, 32 is then fed, as indicated by the arrow 38, in a horizontal direction into the air channels 34, 35. In this embodiment, air flow line elbows may be omitted between the air exit openings 36 of the evaporator fans 33 and the air channels 34, 35.

Furthermore, the air-conditioning plant according to the invention also comprises, additionally, the fresh air part 3 having a height $H_D$ above the roof. On both sides of the condenser part 1, that is to say on both sides of the condenser trough 7, a fresh air part 3 is disposed in an integrated constructional form that extends parallel to the large-surface condenser block 4 up to the housing 13 receiving the condenser fans 11. The fresh air part 3, on both sides of the condenser trough 7, forms fresh air channels 41 and 42 which permit a fresh air feed-in free of pressure head while protecting against rainwater entry. To achieve this fresh air feed-in, the fresh air part 3 has a fresh air inlet 43 (FIG. 3) which points in the direction of travel (i.e., toward the front of the vehicle) and fesh air outlet arrangements 44 which are provided in the area of the opposite end of the fresh air channels 41, 42. The amount of fresh air admitted from the fresh air part 3 is regulatable by means of schematically indicated flaps 45 so that a portion of the air may be fed to the outside-air intake areas 26, 27 for the evaporator 2. For this purpose, as shown, the fresh air channels 41, 42 are connected with intake areas 26, 27 by way of passages 46 formed by the clearance between the bottom of the condenser trough 7 of the condenser 1 and the partitioned-off upper side of the evaporator blocks 21, 22 of the evaporator 2. Of course, proper arrangements are provided for adjusting the position of the flaps 45, which arrangements are not shown. It would also be possible to provide other arrangements regulating the feeding in of fresh air instead of the flaps 45.

Although not shown, air filters for the outside air and the fresh air are also provided, and possibly in the case of the existence of the fresh air part 3, a common air filter for outside air and fresh air may be provided.

As also shown in the drawings, the fresh air part 3 forms a roof-top part having a sheathing of a configuration that is favorable for the air flow in a manner reducing the flow resistance value of the vehicle between the condenser 1 and the contour line of the roof projecting beyond the contour line 5 of the roof. Since the fresh air feed-in is possible free of pressure head, with the help of the fresh air part 3, not only an even feeding in of the fresh air will be made possible, but also a feeding in of the fresh air can be achieved with little noise production. Furthermore, arrangements 44 for the exit of fresh air are designed such that the exiting of the fresh air, indicated by arrows 47, does not disturb the operation of the condenser fans 11 of the condenser part 1 in the tail area. The arrow 48, in FIG. 3, indicates the direction of flow-in of the fresh air by way of the fresh air entry 43 of the fresh air part 3.

In the figures of the drawings, longitudinal spars 49 and 50 of the roof frame of the motor vehicle are also shown, between which the air-conditioning plant is disposed. These longitudinal spars 49, 50 of the roof frame of the vehicle must not be changed for reasons of safety. As can be seen, these longitudinal spars 49, 50 are unchanged according to the invention in the case of the air-conditioning plant and may be used for the attachment and reception of the parts of the air-conditioning plant. The evaporator 2 is fitted into the interval between the longitudinal spars 49, 50 so that the longitudinal spars 49, 50 are altogether integrated into the air-conditioning plant. The air-conditioning plant may thus be formed as a preassembled construction unit that is ready for mounting into the area between the longitudinal spars 49, 50 in the tail area. The air-conditioning plant according to the invention is thus made such that it may be integrated without difficulties into the roof construction of a motor vehicle, such as a bus, that it has a very slight constructional height beyond the roof, that is to say above the contour line 5 and that the inside height in the aisle between the seats will be decreased only minimally and within a permissible range.

Despite a high cooling performance which may amount to more than 23 Kw, the air-conditioning plant of the invention has a relatively short length and width of construction so that a favorable ratio of weight and performance will be obtained. In accordance with the required performances of the air-conditioning plant, the length of it may be changed correspondingly without altogether changing the height of the width. Therefore, the air-conditioning plant of the invention may be extendable without difficulty or it could possibly also be shortened.

Naturally, the number of condenser fans 1 and the number of evaporator (see right side of FIG. 2) fans 33 may deviate from that illustrated.

On the basis of the arrangement of the condenser 1 and the evaporator part 2 lying one on top of the other, the warm exhaust air of the condenser 1 may possibly be branched off from the condenser 1 and may be admixed with the conditioned air in the conditioned air spaces 31, 32 of the evaporator, in the area between the evaporator blocks 21, 22, so that a reheating of the conditioned air is possible after its passage through the evaporator blocks 21, 22 without the use of heating batteries. Then, naturally, the heating batteries 28, 29 shown in the drawing in the evaporator 2, behind the evaporator blocks 21, 22, could be omitted. As a result of that, an additional saving in space and weight will be achieved.

Since a through-flow of the condenser 1 will be obtained with little resistance, on the basis of the horizontal arrangement of the condenser fans 11 behind the large surface condenser 4 in the tail area of the vehicle, it would be possible, depending on the outside temperature or possibly on the speed of the vehicle, to turn off the condenser fans 11, since on the basis of the through-flow with little resistance from the inlet side (arrow 15) to the outlet side (arrow 16), of the condenser block, one could possibly ensure a sufficient cooling of the large-surface condenser block 4, even without the operation of the condenser fans. As a result of such a turning off of the condenser fans 11, the useful life of the driving motors of the condenser fans 11 increases, the need for current by the air-conditioning plant from the supply system of the vehicle decreases and an energy efficient operation of the air-conditioning plant will be made possible. Also a reduction of the consumption of fuel of the vehicle could be achieved thereby.

In the FIGS. 5 to 8, identical or similar parts are provided with the same reference numbers as in the FIGS. 1 to 4. The FIGS. 5 to 8 show the condenser 1 of the air-conditioning plant with the fresh air part 3 with coordination to the roof contour of the vehicle which is indicated by the roof contour line 5. In these figures, only the condenser 1 is shown with the fresh air part 3 forming constructionally a unit with the former.

Also in the FIGS. 9 to 12, parts that are identical or similar to parts in the FIGS. 1 to 4 are provided with the same reference numbers. These FIGS. 9 to 12 show in separate presentations the evaporator part 2 of the air-conditioning plant with coordination to the roof contour of the motor vehicle which is indicated by the roof contour line 5. Furthermore, in the FIGS. 9 to 12, the fresh air part 3 is also shown with coordination to the evaporator part 2. These figures serve especially for the clarification of the basic construction of the evaporator part 2 with the evaporator blocks 21 and 22 and the evaporator fans 33.

As becomes apparent from the figures of the drawing, as a whole, the condenser 1, the evaporator 2 and the fresh air part 3 are disposed symmetrically to the longitudinal middle axis 51 of the roof of the vehicle in order to make, as much as possible, a space-saving construction of the air-conditioning plant, without the stand-up height, available in the center aisle area of the motor vehicle, being restricted in an impermissible manner.

While I have shown and described a single embodiment in accordance with the present invention, it is understood that the same is not limited thereto, but is susceptible of numerous changes and modifications as known to those skilled in the art, and I, therefore, do not wish to be limited to cover all such changes and modifications as are encompassed by the scope of the appended claims.

I claim:

1. An air-conditioning plant for motor vehicles, especially for buses, comprising: a condenser which contains a downwardly sloping large-surface condenser block and condenser fans for carrying off condenser exhaust air; and an evaporator partitioned-off relative to the condenser which contains evaporator blocks that extend parallel to each other in a vehicle longitudinal direction, but are spaced from each in a direction transverse to said vehicle longitudinal direction in a manner forming an air intake space for the evaporator therebetween, and evaporator fans for conveying fresh air through the evaporator and into air channel means of the vehicle; wherein the air conditioning plant and the condenser thereof are constructed for being partially recessed into the roof of the vehicle in a tail area thereof with the evaporator blocks being disposed, in a direction toward a vehicle interior space, below the condenser at laterally opposite sides thereof, and with the condenser fans being disposed behind the large-surface condenser block in the tail area of the vehicle.

2. Air-conditioning plant for motor vehicles as in claim 1, a fresh air intake area is formed in association with each evaporator block that extends parallel to the longitudinal direction of the evaporator blocks.

3. Air-conditioning plant for motor vehicles as in claim 1 wherein, in an installed condition of the plant, the condenser fans are disposed side by side transversely to the vehicle longitudinal direction.

4. Air-conditioning plant for motor vehicles as in claim 3, wherein, in the installed condition of the plant, axles of the condenser fans are horizontally aligned in parallel toward a forward end of the vehicle.

5. Air-conditioning plant for motor vehicles as in claim 3, wherein, in the installed condition of the plant, a front side of a housing surrounding the condenser fans lies approximately in an extension of the tail plane of the vehicle.

6. Air-conditioning plant for motor vehicles as in claim 5, wherein, in said installed condition, the housing surrounding the condenser fans, behind the large-surface condenser block, is enlarged transversely to the vehicle longitudinal direction relative to the width of the condenser block.

7. Air-conditioning plant for motor vehicles as in claim 4, wherein the axles of the condenser fans are disposed approximately in the middle of the total height of the condenser and the evaporator.

8. Air-conditioning plant for motor vehicles as in claim 1, wherein, in an installed condition of the plant, the evaporator fans are disposed at the level of the air channel means of the vehicle in parallel to the longitudinal extent of the evaporator blocks in such a way that air exit openings thereof point horizontally to a side in a direction toward inlet opening means of the air channel means of the vehicle.

9. Air-conditioning plant for motor vehicles as in claim 8, wherein the evaporator fans air are double radial fans.

10. Air-conditioning plant for motor vehicles as in claim 1, wherein the evaporator contains at least one heating battery for warming of air passing therethrough.

11. Air-conditioning plant for motor vehicles, as in claim 1, further comprising means for communicating warm exhaust air of the condenser with air conditioned by the evaporator for heating-up of the conditioned air in a regulatable manner prior to its entry into the evaporator fans.

12. Air-conditioning plant for motor vehicles as in claim 1, wherein a fresh air part is disposed opposite sides of the condenser in the form of a rooftop part having a fresh air channel, said fresh air part extnding in parallel to the condenser block up to a housing part enclosing the condenser fans and is connected in a regulatable manner with the air intake space of the evaporator.

13. Air-conditioning plant for motor vehicles as in claim 12, wherein a fresh air entry of a fresh air channel of the fresh air part, in an installed condition, faces toward the front of the vehicle and in that a fresh air exit is provided in an area of an opposite end of the fresh air channel.

14. Air-conditioning plant for motor vehicles as in claim 13, wherein in flaps are provided in the fresh air part for the regulation of the portion of fresh air admitted to the air intake space of the evaporator.

15. Air-conditioning plant for motor vehicles as in claim 13, wherein said fresh air exit is oriented for directing fresh air out of the fresh air part in a lateral direction.

16. Air-conditioning plant for motor vehicles as in claim 13, wherein the fresh air part is partitioned-off from the condenser part.

17. Air-conditioning plant for motor vehicles as in claim 1, wherein the downward slope of the large-surface condenser block is inclined in relation to a horizontal plane at an angle of up to 20 degrees.

18. Air-conditioning plant according to claim 17, wherein said angle is between 5 and 12 degrees.

19. Air-conditioning plant according to claim 17, wherein said angle is approximately 3 degrees.

20. Air-conditioning plant for motor vehicles as in claim 1, wherein the condenser, the evaporator and the fresh air part, in an installed condition, are disposed symmetrically to the central longitudinal axis of the roof the motor vehicle, and wherein they are formed into a construction unit mountable and demountable as a whole.

21. Air-conditioning plant for motor vehicles as in claim 1, wherein said evaporated fans comprise three double radial fans assigned to each evaporator block and six condenser fans assigned to the condenser block.

22. Air-conditioning plant according to claim 1, wherein, in an installed condition of said plant, a portion of the condenser block is recessed below a roof line of the vehicle.

* * * * *